United States Patent [19]
Nilsson et al.

[11] Patent Number: 5,820,103
[45] Date of Patent: Oct. 13, 1998

[54] BALL SEGMENT VALVE AND BALL SEGMENT VALVE ARRANGEMENT

[75] Inventors: Curt Nilsson; Folke Hubertson, both of Säffle, Sweden

[73] Assignee: Aktiebolaget Somas Ventiler, Saffle, Sweden

[21] Appl. No.: 788,698

[22] Filed: Jan. 24, 1997

[30]   Foreign Application Priority Data

Jan. 25, 1996 [SE] Sweden ................................ 9600261

[51] Int. Cl.⁶ ...................................................... F16K 5/06
[52] U.S. Cl. ............................... 251/315.09; 251/315.16; 137/315
[58] Field of Search ......................... 251/315.09, 315.16; 137/315

[56]   References Cited

U.S. PATENT DOCUMENTS

| | | | |
|---|---|---|---|
| 3,301,271 | 1/1967 | Burke ........................................ | 137/315 |
| 3,985,334 | 10/1976 | Domyan .......................... | 251/315.09 X |
| 4,214,732 | 7/1980 | Kindersley ............................... | 251/315 |

FOREIGN PATENT DOCUMENTS

| | | |
|---|---|---|
| 0 159 799 | 3/1985 | European Pat. Off. . |
| 0 346 216 | 12/1989 | European Pat. Off. . |
| 0 423 094 | 4/1991 | European Pat. Off. . |

*Primary Examiner*—John Fox
*Attorney, Agent, or Firm*—Nikaido, Marmelstein, Murray & Oram LLP

[57]   ABSTRACT

A ball segment valve comprise a valve housing (23) with a circular annular valve seat (28), a valve body (26) which has the shape of a spherical segment which is rotatable about an axis of rotation (49) which intersects the center of the sphere of which the valve body constitutes a segment, a rotating spindle (41) which extends through and is mounted in one side of the valve housing, and a journal bar (43).

The rotating spindle and the journal bar are interconnected by a bow (42) in order to form together with the bow a continuous rotating unit (25).

The journal bar is mounted in a cover (24) which covers a hole (64) in the other side of the valve housing, which hole is sufficiently large that the rotating unit can be introduced through the hole into its intended operating position in the valve housing and be fixed in this position by subsequent mounting of the cover.

The bow comprises a pair of legs (46, 47) which are connected to the rotating spindle and to the journal bar respectively, together with a yoke (45) connecting said legs at a distance from the axis of rotation (49), the valve body being mounted on said yoke.

6 Claims, 4 Drawing Sheets

Fig.1. PRIOR ART
Fig.2. PRIOR ART
Fig.3. PRIOR ART
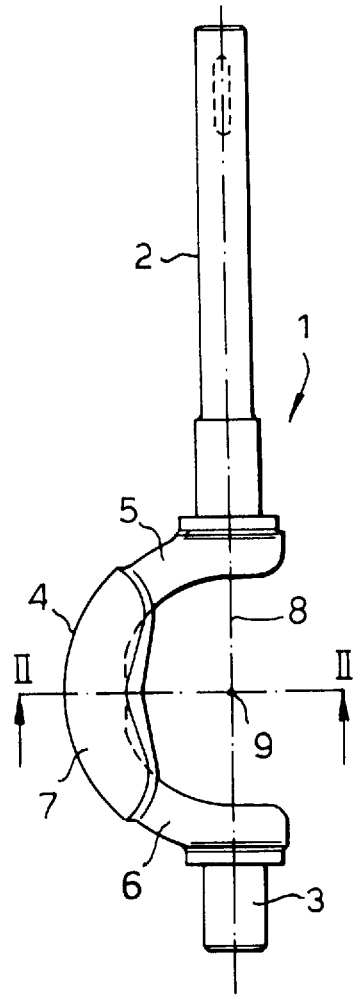
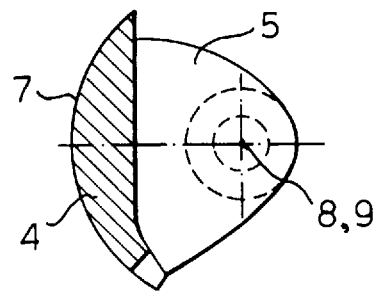
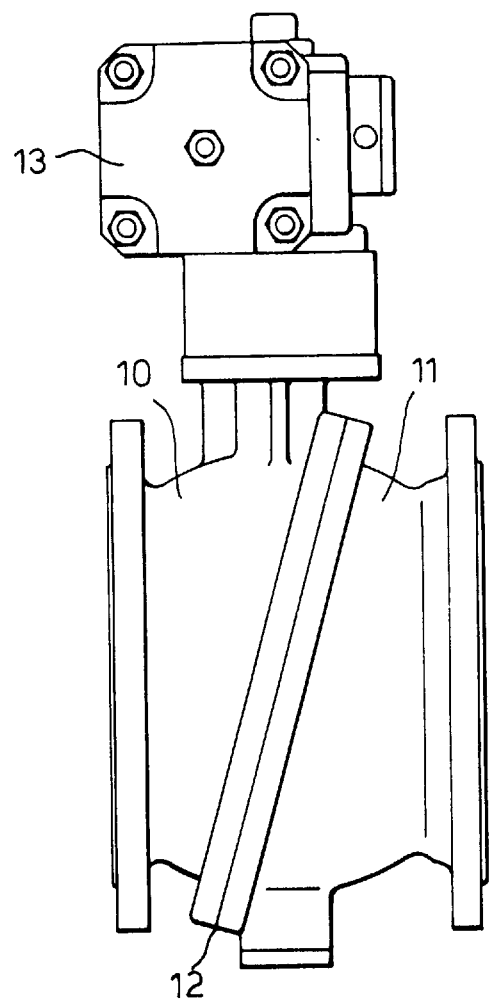

5,820,103

1

BALL SEGMENT VALVE AND BALL SEGMENT VALVE ARRANGEMENT

TECHNICAL FIELD

The invention relates to a ball segment valve comprising a valve housing with an inlet opening and an outlet opening, a flow duct between the inlet and outlet openings, together with a circular annular valve seat, a valve body which has the shape of a spherical segment which is rotatable about an axis of rotation which intersects the centre of the sphere of which the valve body constitutes a segment, together with means of rotating the valve body in the valve housing about the axis of rotation, sliding taking place between the spherical surface of the valve body and the seat, between a completely closed position, in which the spherical surface of the valve body is in sealing contact with the seat along the entire circumference of the latter, and an at least essentially completely open position, in which the valve body has at least essentially left its contact with the seat, via intermediate regulating positions, in which the valve is partially open, in each such regulating position the spherical surface of the valve body being in contact with the seat along a single uninterrupted sector of the circumference of the seat, and vice versa, which means comprise a rotating spindle which is coaxial with said axis of rotation and which extends through and is mounted in one side of the valve housing, together with a journal bar which is also coaxial with the axis of rotation and is mounted in the opposite side of the valve housing, which rotating spindle and journal bar are connected to the valve body.

The invention also relates to a ball segment valve arrangement consisting of a valve body which has the shape of a spherical segment intended to bear with its spherical surface against an annular seat in a valve housing, together with means of rotating the valve body about an axis of rotation which intersects the centre of the sphere of which the spherical surface constitutes a segment.

STATE OF THE ART

Ball segment valves are used as shut-off valves but in particular for regulating the flow in pipes in actions in industrial procedures. The regulation takes place by rotating the ball segment shaped valve body about the axis of rotation and setting the valve body in various regulating positions between 0° and 90°, usually in rotational positions between 0° and 60°, from the entirely closed position. In order to improve the regulating characteristics of the valve, it is usual for the spherical surface to be provided with one or more grooves, recesses or the like and/or to be provided with supplementary regulating members.

FIGS. 1 and 2 in the attached drawing figures show a known arrangement according to the state of the art and FIG. 3 shows a known ball segment valve which contains an arrangement according to FIGS. 1 and 2, where FIG. 2 shows the arrangement in a view along II—II in FIG. 1. The arrangement 1 is manufactured by machining of a single casting and consists of a rotating spindle 2, a journal bar 3 and, between these, a valve body 4 which is connected to the rotating spindle 2 and to the journal bar 3 by a pair of legs 5, 6. The valve body 4 has a sealing surface 7 with the shape of a spherical segment. The axis of rotation 8 of the valve body 2 and the journal bar 3 intersects the centre 9 of the sphere, of which the spherical sealing surface 7 constitutes a segment. In the integrated valve, FIG. 3, a valve housing consists of two halves 10, 11, interconnected by means of flange connection in a diagonal dividing plane 12. On

2 assembly, the rotating spindle 2 is inserted into one valve housing piece 10 and the journal bar 3 into the other valve housing piece 11, after which the two valve housing pieces 10, 11 are interconnected by screw connection. An adjusting device 13 is connected to the rotating spindle 2 for rotation of the arrangement 1 and with this of the valve body 4, with the spherical sealing surface 7 sliding against a non-annular valve seat in the valve housing half 10. This known system has certain disadvantages. The manufacture of the spherical sealing surface 7 by machining the casting involves a number of practical problems as the entire workpiece with associated rotating spindle 2, journal bar 3 and legs 5 has to be handled in the machine. Another disadvantage is that each arrangement 1 is unique to each valve size which means little or no possibility of standardization. Furthermore, the manufacture of the valve housing with two valve housing halves involves complications as far as both casting and machining are concerned and with this increased costs. As far as the manufacture of the valve housing is concerned also, there are few or no possibilities of standardization.

U.S. Pat. No. 3,722,545 describes a ball segment valve, in which the valve housing is formed in one piece, the valve body with associated rotating spindle and journal mounting being designed to be introduced into the valve housing from the side of the rotating spindle and the adjusting device. For this, a very large hole is arranged on said side of the valve housing, which is a disadvantage. Among other things, such a large hole prevents so-called clamping execution of the valve housing. This is because such execution requires it to be possible for bolts to extend between consecutive pipelines, past the valve housing. A hole of the size in question prevents this. It does not emerge entirely clearly from the patent specification whether the valve body, the valve spindle, an annular bearing pin on the opposite side of the rotating spindle and the connecting legs to the valve body are made in one or more pieces or as two or more parts. In both cases, and in particular if all parts are formed in one piece, the same difficulties are experienced in machine cutting as in the case of the arrangement described above. In the latter case, a connection has to be brought about between the rotating spindle and other parts in the construction, and possibly also between said annular journal bar and the arrangement in general. In such axial connections, usually screw connections, which are exposed to considerable torsion forces, slight play arises gradually. The presence of such axial connections established by screw connections or with the aid of other fastening elements between the rotating spindle and other parts in the arrangement therefore constitutes a disadvantage.

U.S. Pat. No. 4,989,833 discloses a ball segment valve, in which the valve body with associated legs is, on assembly, introduced into the valve housing through the outlet opening, after which the rotating spindle and the journal bar are introduced from their respective directions and are connected to the legs inside the valve housing. The construction represents a typical example of axial connections in the form of screw connections or similar fastening elements between the rotating spindle and the journal bar on the one hand and the torque-transmitting legs of the valve body on the other hand.

BRIEF DESCRIPTION OF THE INVENTION

The aim of the invention is to provide a ball segment valve and an arrangement of such a ball segment valve according to the introduction above but which does not suffer from said disadvantages of the known art. More specifically, the invention aims to provide a ball segment valve and an arrangement which satisfy the following conditions:

principally, it is to be possible to manufacture the entire valve housing in one piece, it is to be possible to use the invention for both flanged valve housings, for valve housings which are clamped between flanges on consecutive pipeline sections, and for valve housings intended to be connected to consecutive pipeline sections by welded joints or in another manner, it is to be possible to manufacture the rotating spindle on the journal bar from a continuous workpiece, the invention is to afford possibilities of standardization of components included in the integrated valve within at least certain size ranges, it is to be possible to manufacture the valve body, including its spherical surface, with high precision and in a rational manner in automatically operating machine tools and it is to be possible to combine the various parts of the valve easily and with high precision to form an integrated unit.

It is possible to achieve these and other aims and advantages of the invention in that it is characterized by what is indicated in the patent claims below. Further characteristics and aspects of the invention emerge from the following detailed description of two possible embodiments.

BRIEF DESCRIPTION OF THE FIGURES

In the following detailed description, reference is made to the attached drawing figures, in which FIGS. 1–3 show an arrangement and an integrated valve which has been described briefly above in the description of the state of the art.

DETAILED DESCRIPTION OF THE INVENTION

Figure 4:
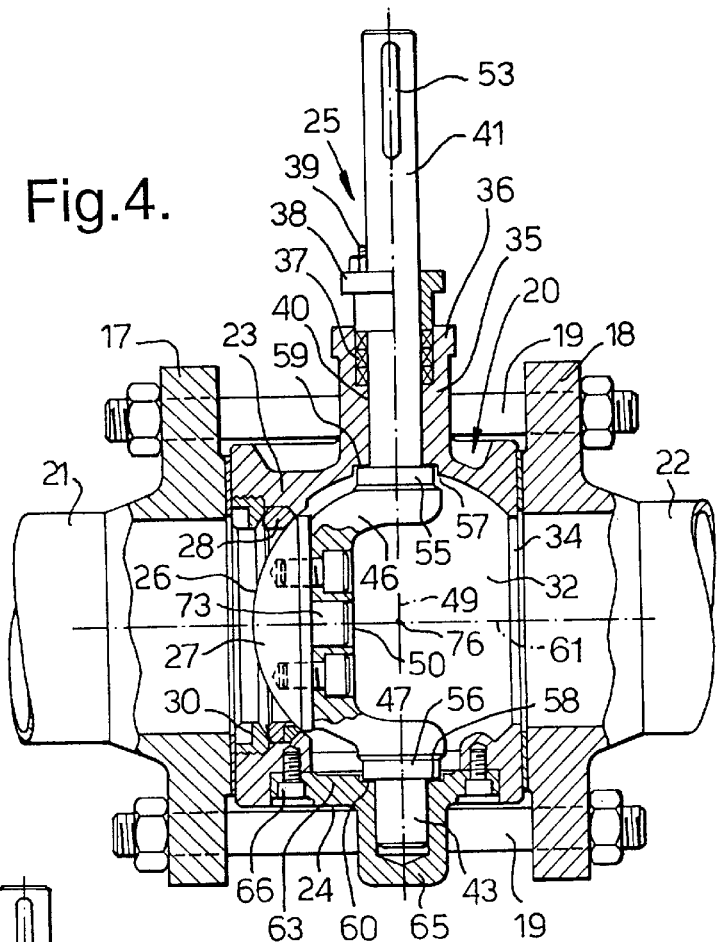
FIG. 4 shows a valve according to the invention with a valve housing in a so-called clamping embodiment, clamped in a pipeline between two pipeline sections.
Figure 5:
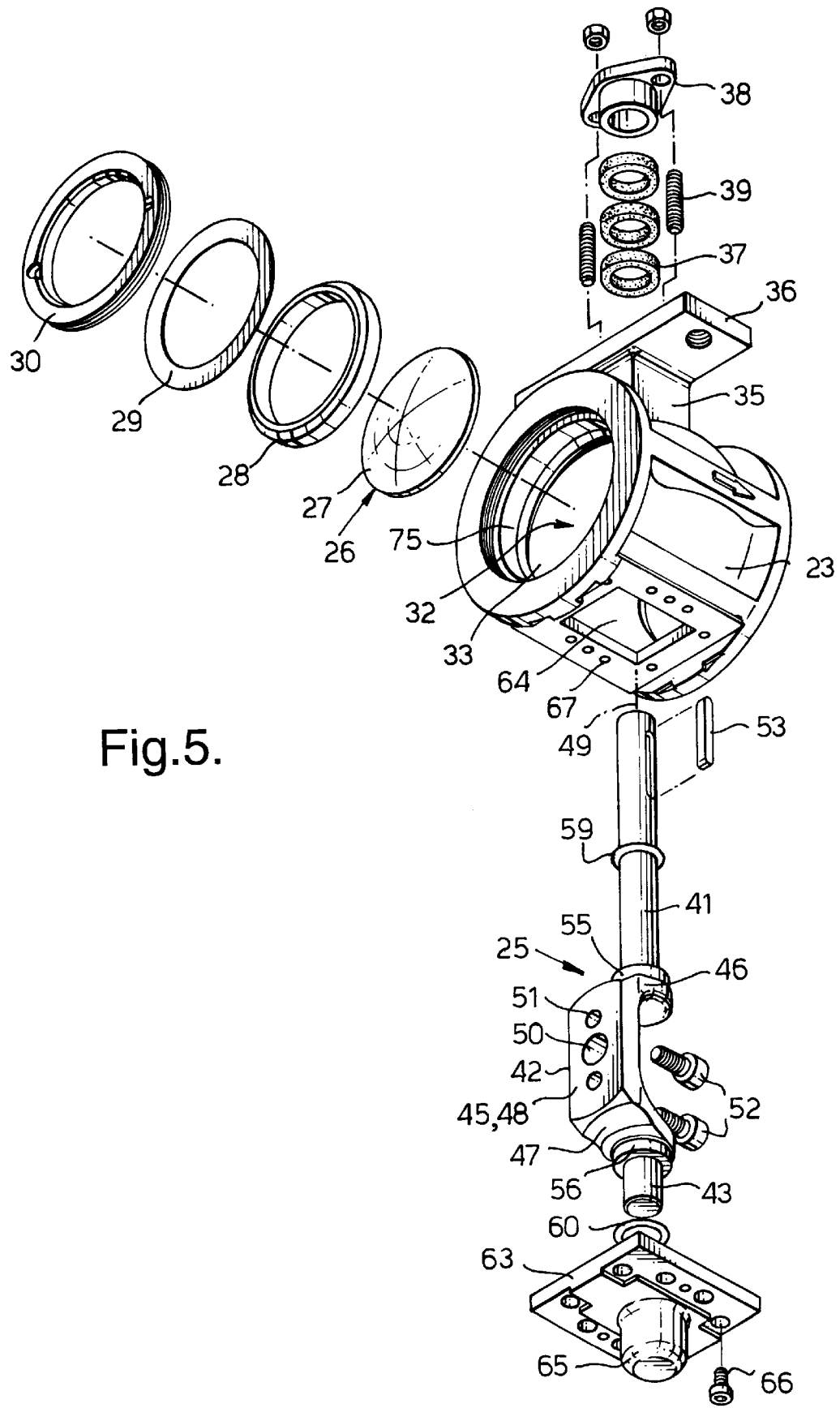
FIG. 5 shows in an exploded view the various components which are included in the valve in FIG. 4.
Figure 6:
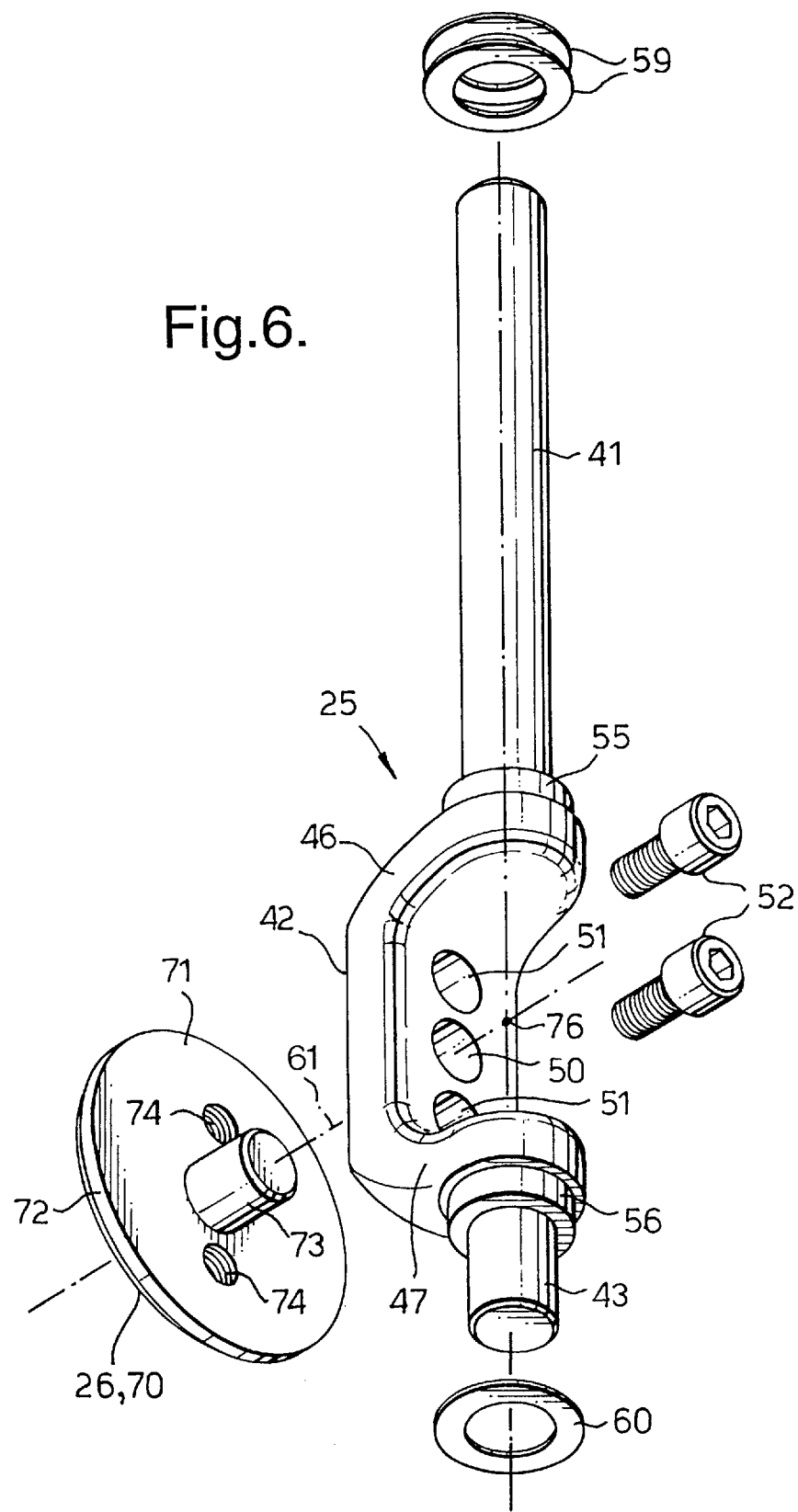
FIG. 6 shows a different perspective view of some essential components included in the valve.

With reference to FIGS. 4–6, a ball segment valve is generally designated by number 20. It has a valve housing 23 of the so-called clamping type which means that the valve 20 is clamped between flanges 17, 18 on consecutive pipeline sections 21, 22 with the aid of screws 19 with seals arranged between the ends of the pipe sections and the end walls of the valve housing 23. The main pails of the valve 20 consist of said valve housing 23 and a valve housing cover 24, a unit 25 which in this text is called a rotating unit and a valve body 26 with a spherical sealing surface 27, together with a valve seat ring 28, a spring washer 29 and a covering washer 30.

The valve housing 23 is cast in one piece with an inlet opening 33 which is connected to one pipe section 21 and an outlet opening 34 which faces the other pipe section 22. Between the openings, a flow duct 32 extends through the valve housing. On one side of the valve housing 23, there is a projecting neck 35 with a through-hole 40 for a rotating spindle 41 on the rotating unit 25. The neck 35 ends in a shoulder 36 on which an adjusting device (not shown) for rotating the rotating unit 25 is mounted. In a conventional manner, there are also packings 37, a gland 38 and also stud bolts 39 and nuts for tightening the gland 38 in the neck 35.

The rotating unit 25 is made from a single, that is to say monolithic, cast piece of material. It consists of said rotating spindle 41, a bow 42 and a journal bar 43 which is coaxial with the rotating spindle 41. The bow 42 consists of a yoke 45 and a pair of legs 46, 47 which connect the yoke 45 to the rotating spindle 41 and the journal bar 43 respectively. The yoke 45 has a face-milled side 48 which lies at a distance from and is parallel to the centre line 49 through the rotating spindle 41 and the journal bar 43, which is also the axis of rotation of the rotating unit 25. Extending through the yoke 45 are, on the one hand, a central cylindrical through-hole 50 and, on the other hand, on either side of the central hole 50, a pair of through-holes 51 for fastening screws 52 for the valve body 26.

In the assembled valve, the centre line/axis of rotation 49 of the rotating unit intersects the centre 76 of the sphere, of which the spherical sealing surface 27 of the valve body constitutes a part.

The rotating spindle 41 has in its outer end a keyway in a conventional manner for a key 53 for imparting torque to the rotating spindle 41 and with this to the entire rotating unit 25 from the adjusting device (not shown). In the transition between the rotating spindle 41 and the leg 46, there is a first annular flange part 55 with a greater diameter than the main part of the rotating spindle 41 and, in the transition between the other leg 47 and the journal bar 43, there is a second similar annular flange part 56. In the valve housing wall and the valve housing cover 24, there are corresponding annular recesses 57 and 58 respectively. Between the plane surfaces on the flange parts 55, 56 and annular bottom surfaces in the recesses 57 and 58 respectively, there is a certain play which is filled by one or more shims, that is to say very thin washers 59, 60, which are selected of such a thickness that the play is filled out and so that the central hole 50 can be centred with very high accuracy relative to the axial center line 61 of the valve seat 28, that is to say so that the centre line of the hole 50 comes to conicide with very high accuracy with the center line 61, when the valve unit 25 has been rotated to the sealing position, FIG. 4. This will also be explained below in the description of how the valve is assembled.

The cover 24 consists of a rectangular plate 63 which covers a rectangular hole 64 in the valve housing wall, which is opposite the through-hole 40 for the rotating spindle 41. The rectangular hole 64 extends in the axial direction of the valve housing 23 and has a width which only slightly exceeds the greatest width of the rotating unit 25, more specifically only slightly exceeds the width of the yoke 45, and a length which only slightly exceeds the maximum extent of the rotating unit 25 in a plane at right angles to the plane side 48 of the yoke 45, coinciding with the centre line 49. On the plate 63, there is a bearing housing 65 which forms a sliding bearing for the journal bar 43 which is hard chromium-plated. The cover 63 is fastened, by means of screws 66 which extend through through-holes in the plane plate 24, to the valve housing 23 which is face-milled on the outside around the hole 64.

The valve body 26 has a geometrically very simple, rotationally symmetrical shape which is very easy to produce by machining in an automatically operating machine tool. More specifically, the valve body consists of a spherical segment 70 with a spherical sealing surface 27 and a plane rear side 71 which, according to the embodiment, is parallel to a cutting-off plane which defines the spherical surface 27. Between the spherical surface 27 and the rear side 71, there is a circumferential edge 72. The spherical surface 27 is polished to a high surface fineness. According to the embodiment, the circumferential edge 72 is circular and the entire valve body 70 is rotationally symmetrical. However, there is nothing to prevent the valve body being provided with recesses, grooves in the spherical surface 27, projections and the like in order to improve, according to known principles, the regulating characteristics of the valve.

From the plane rear side 71, a central centring pin 73 extends backwards at right angles to the plane of the rear side 71. The pin 73 is cylindrical and has a diameter which corresponds to the diameter of the central hole 50 in the yoke 45 so that the pin 73 can be introduced into the hole 50 with a good fit. The length of the pin 73 is somewhat smaller than or equal to the length of the hole 50. In the valve body 26, there is also a pair of threaded holes 74 which extend in to a given depth from the plane rear side 71 in order to be capable of receiving the fastening screws 52.

The parts described are assembled to form an integrated operational valve 20 in the following manner. First, the rotating unit 25 is introduced into the valve housing 23 through the hole 64 with one or more shims 59 slipped over the rotating spindle 41 which is introduced into the through-hole 40. One or more shims 60 are slipped in a corresponding manner over the journal bar 43, after which the cover 24 is screwed tight over the hole 64, with the journal bar 43 supported hi the bearing housing 65. On the opposite side, the packings 37 are slipped over the rotating spindle 41 as is the gland 38 which is screwed tight. Subsequently, the valve body 26 is introduced through the inlet opening 33 of the valve and the centring pin 73 is introduced into the central hole 50 in the yoke 45 on the rotating unit 41. The valve body 26 is screwed tight on the yoke 45 with the aid of the screws 52 in the direction from the outlet opening 34 of the valve housing, so that the plane rear side 71 of the valve body 26 is pressed against the plane front side 48 of the yoke 45. Subsequently, the seat ring 28 is placed in its valve seat ring groove 75. The spring washer 29 is placed over the valve seat ring 28 and the externally threaded covering washer 30 is screwed tight, so that the spring washer 29 is clamped and presses the seat ring firmly into its groove 75. Subsequently, it is verified whether the valve body is centred relative to the seat ring 28. If this should not be the case, depending on normal tolerances in the manufacture of the annular recesses 57, 58 in the valve housing 23, the valve is dismantled and new slims 59, 60 are inserted, so that these correct the descrepancy measured. Subsequently, the valve is re-assembled, with the valve body 26 centred relative to the valve seat ring 28. When the rotating unit 25 and the valve body 26 adopt the position which is shown in FIG. 4, the spherical sealing surface 27 bears sealingly against the seat ring 28 around its entire circumference and the axis of rotation 49 of the rotating unit 25 intersects the centre 76 of the sphere of which the spherical sealing surface 27 constitutes a segment. On rotation of the rotating unit 25, the spherical sealing surface 27 slides against the seat ring 28 and the valve body 26 can, in a manner which is conventional per se, be set in various regulating positions, as explained in the introduction to this description.

The valve 20 is shown in FIG. 4 clamped between the flanges 17, 18 on the consecutive pipeline sections 21, 22. The figure shows that the clamping screws 19 extend between the flanges 17, 18, past the valve 20, without hindering either the neck 35 with the shoulder 36 or the valve housing cover 24 with the plate 63 and the bearing housing 65.

Figure 7:
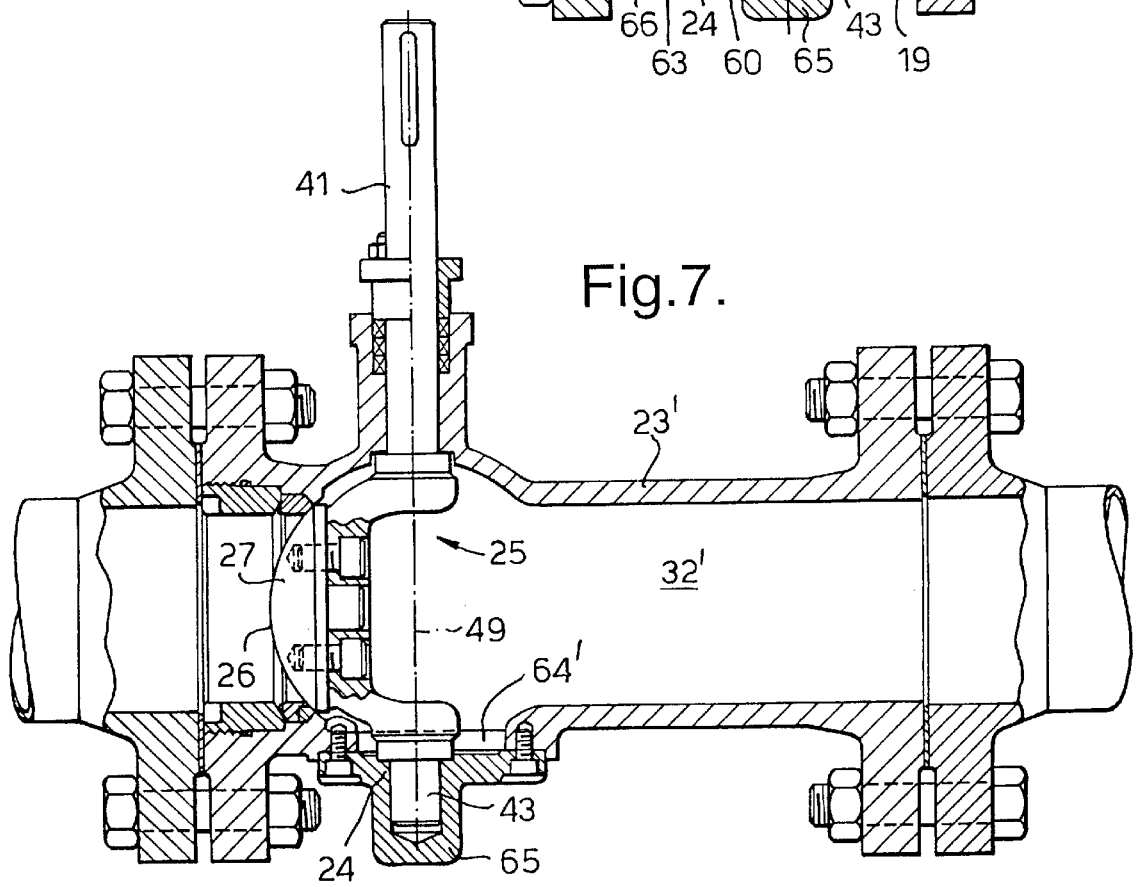
FIG. 7 shows in cross-section a valve according to the invention with the valve housing in a so-called flanged embodiment, flanged to a pair of consecutive pipeline sections.

The rotating unit 25, with certain given dimensions, can be used for valve bodies 26 of different sizes, including different radii of the spherical sealing surface 27, within a certain size range which means certain standardization in manufacture and stock-keeping is possible. The cover 24 also can be used as a standardized component for different embodiments of valve housing and/or within a certain size range. This is illustrated by the exemplary embodiment which is shown in FIG. 7, in which a cover 24 of the same design as in the preceding embodiment is used to close a hole 64' in a valve housing 23' of a completely design, namely a so-called flanged embodiment. The hole 64' and the cover 24 are in this case turned through 180° compared with the embodiment according to FIG. 4 and FIG. 5, the rotating unit 25 being introduced through the bole 64' rotated through 180° about the axis of rotation 49', to be rotated forwards through 180°, on assembly of the valve body 26, to the position shown in FIG. 7. The flow duct 32 is in this case considerably longer than in the clamping embodiment. In other respects, with regard to the various components in the valve and their assembly, refer to the description of the preceding embodiment.

MODIFICATIONS

It is advantageous from the point of view of both manufacture and use to be capable of designing the valve body, including the centring pin 73, in one piece as a rotationally symmetrical body and to make a matching central hole 50 in the yoke 45. However, it is entirely possible instead to design a pin on the yoke on the side which is intended to face the valve body and a centring hole on the rear side of the valve body.

There is also a third alternative. This is to make preferably cylindrical holes in both the valve body and the yoke (the latter hole a through-hole) and to drive a centring pin through the hole in the yoke and on into the hole in the valve body in conjunction with the assembly inside the valve housing.

The spherical sealing surface of the valve body can also be modified and supplemented by arrangements for improving the regulating characteristic of the valve, which has been mentioned already in the introduction to this description. The specific design of the valve seat does not constitute a part of the invention. As an example, it can be mentioned that it can be constituted by a fixed, circumferential edge in the valve housing or, as in the cases illustrated, by a ring made of metal or ceramic or of an elastomeric material or of a composite material. Different embodiments of the valve housing also have been shown and referred to above.

We claim:
1. Ball segment valve comprising a valve housing with an inlet opening and an outlet opening, a flow duct between the inlet and outlet openings, together with a circular annular valve seat, a valve body which has the shape of a spherical segment which is rotatable about an axis of rotation which intersects the centre of the sphere of which the valve body constitutes a segment, together with means for rotating the valve body in the valve housing about the axis of rotation, sliding taking place between the spherical surface of the valve body and the seat, between a completely closed position, in which the spherical surface of the valve body is in sealing contact with the seat along the entire circumfer- ence of the latter, and an at least essentially completely open position, in which the valve body has at least essentially left its contact with the seat, via intermediate regulating positions, in which the valve is partially open, in each such regulating position the spherical surface of the valve body being in contact with the seat along a single uninterrupted sector of the circumference of the seat, and vice versa, which means for rotating the valve body comprise a rotating spindle which is coaxial with said axis of rotation and which extends through and is mounted in one side of the valve housing, together with a journal bar which is also coaxial with the axis of rotation and is mounted in the opposite side of the valve housing wherein the rotating spindle and the journal bar are interconnected by a bow in order to form together with the bow a continuous rotating unit, the journal bar of the rotating unit is mounted in a cover which constitutes a part of said opposite side of the valve housing, which cover covers a hole in said opposite side, which hole is so large that the rotating unit can be introduced through the hole into its intended operating position in the valve housing and be fixed in this position by subsequent assembly of the cover over said hole with the journal bar extending into said cover, the bow comprises a pair of legs connected to the rotating spindle and to the journal bar respectively, together with a yoke which connects said legs at a distance from the axis of rotation, the valve body is mounted on said yoke on a side of the yoke which faces away from the axis of rotation, and wherein the hole in said opposite side of the valve housing is not sufficiently large that it is possible for the rotating unit with the valve body mounted on the yoke to be introduced into the operating position in the valve housing through said hole, but in that the valve body can be introduced into the valve housing through at least one of said inlet and outlet openings, and in that it is mounted on the yoke in the valve housing.

2. Ball segment valve according to claim 1, wherein the valve body and the yoke are provided with interacting centring members which determine the positioning of the valve body centrally on the yoke.

3. Ball segment valve according to claim 2, wherein said interacting centring member comprises a pin which, in a plane at right angles to the axial centre line of the centring member, has a circular shape, preferably in that the pin is at least partially cylindrical, and in that the pin extends out from the centre of the rear side of the valve body, that is to say the side of the valve body which is opposite the spherical side, and in that the yoke has a hole of matching shape.

4. Ball segment valve according to claim 2, wherein said interacting centring members comprise a hole, preferably an at least partially cylindrical central hole in the valve body on the rear side of this, and in that the yoke has a central pin of matching shape.

5. Ball segment valve according to claim 1, wherein the rear side (73) of the valve body is at least partially plane, and in that the side (48) of the yoke which faces the valve body is also at least partially plane, and in that said plane sides on the valve body and on the yoke are pressed against one another.

6. Ball segment valve according to claim 1, wherein the valve body and the rotating unit are interconnected by fastening elements (52), preferably screws, which extend through holes (51) in the yoke (45).

* * * * *